United States Patent
Martincik

(10) Patent No.: US 7,370,790 B2
(45) Date of Patent: May 13, 2008

(54) APPARATUS FOR VISUALIZING AND DETERMINING HOLDING PATTERN AND ENTRY

(76) Inventor: Jan Martincik, deceased, late of Milpitas, CA (US); by Jana Martincikova, legal representative, 1868 Dalton Dr., Milpitas, CA (US) 95035

( * ) Notice: Subject to any disclaimer, the term of this patent is extended or adjusted under 35 U.S.C. 154(b) by 254 days.

(21) Appl. No.: 11/207,338

(22) Filed: Aug. 19, 2005

(65) Prior Publication Data

US 2007/0040011 A1 Feb. 22, 2007

(51) Int. Cl.
*G01C 21/20* (2006.01)

(52) U.S. Cl. .............. 235/61 NV; 235/61 D; 235/61 S; 235/61 V; 701/3; 701/200; 340/971

(58) Field of Classification Search ........... 235/61 NV, 235/61 D, 61 S, 61 V; 701/3, 200; 340/971
See application file for complete search history.

(56) References Cited

U.S. PATENT DOCUMENTS

| | | | |
|---|---|---|---|
| 2,996,242 A | 8/1961 | Bannister | |
| 3,110,965 A | 11/1963 | Kittock | |
| 3,232,685 A | 2/1966 | Wilstein et al. | |
| 4,103,809 A | 8/1978 | Frost et al. | |
| 4,154,190 A * | 5/1979 | Utgoff | 116/335 |
| 4,243,249 A | 1/1981 | Goss | |
| 4,274,204 A | 6/1981 | Self | |
| 5,214,855 A | 6/1993 | Gibbs | |
| D338,683 S | 8/1993 | Erickson | |
| 5,553,387 A | 9/1996 | Newcomb | |
| D377,942 S | 2/1997 | McCloy | |
| 5,833,467 A | 11/1998 | Dodd | |
| 6,167,627 B1 | 1/2001 | Wilder et al. | |
| 6,405,107 B1 * | 6/2002 | Derman | 701/3 |
| 6,520,394 B2 | 2/2003 | Ulibarri | |
| 6,691,442 B2 | 2/2004 | Gross | |
| 7,152,332 B1 * | 12/2006 | Jain et al. | 33/1 SD |
| 2005/0004745 A1 * | 1/2005 | Rumbo et al. | 701/200 |
| 2006/0012492 A1 * | 1/2006 | Degidio | 340/971 |
| 2006/0020374 A1 * | 1/2006 | Kenner | 701/3 |

* cited by examiner

*Primary Examiner*—Michael G. Lee
*Assistant Examiner*—Allyson N Trail

(57) ABSTRACT

A holding pattern aid apparatus to enable a pilot in instrument conditions to instantly visualize a holding pattern and determine an appropriate entry procedure, is disclosed. The aid is configured to attach to a kneeboard while permitting the pilot to flip the display from right to left holding pattern with one hand or even the flick of a finger. The apparatus also indicates the appropriate teardrop outbound course and parallel intercept course, as well as providing instant reciprocal headings and a DME Arc aid. A lanyard attach point enables the pilot to quickly find the holding pattern aid when loose and prevents the aid from becoming lost in the cockpit should it become detached from the kneeboard.

20 Claims, 6 Drawing Sheets

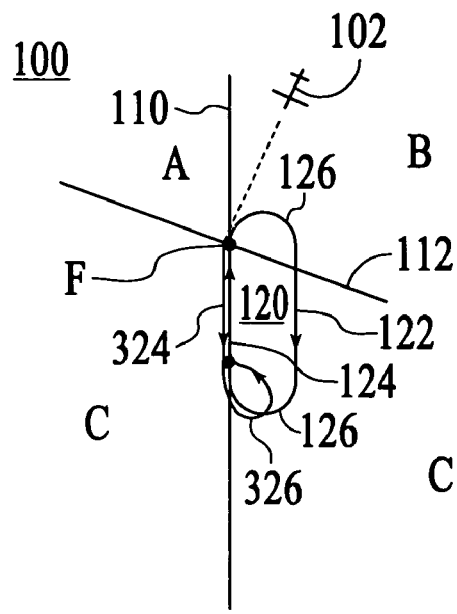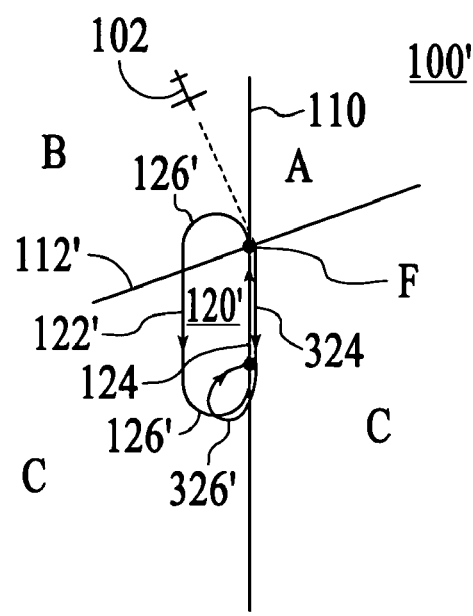
FIG.3A  FIG.3B
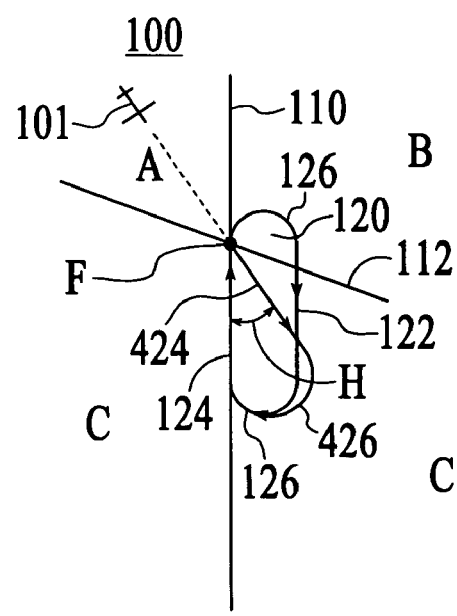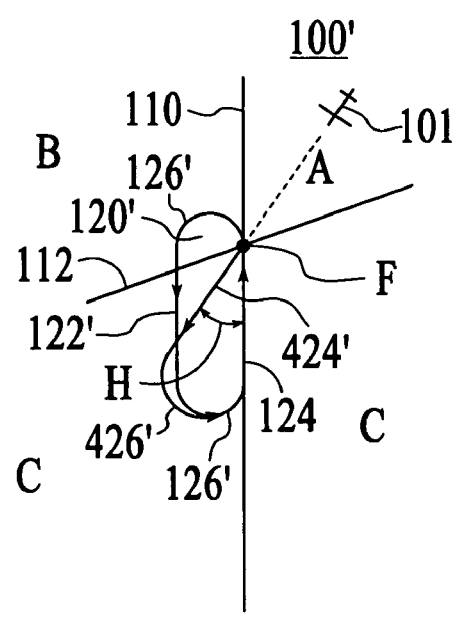
FIG.4A  FIG.4B

APPARATUS FOR VISUALIZING AND DETERMINING HOLDING PATTERN AND ENTRY

BACKGROUND OF THE INVENTION

1. Field of the Invention

Embodiments of the present invention generally relate to devices used by pilots to determine entry into a holding pattern.

2. Description of the Related Art

Both commercial and general aviation flying depend on weather and flight rules defined by Federal Aviation Administration (FAA). If the weather is good and the flight is below 18,000 feet the FAA may permit aircraft to fly using simple visual flight rules (VFR). Under VFR a pilot may only operate at minimum prescribed distances from clouds and defined visibility. If the visibility is restricted or the airplane must fly in the clouds or if the flight is above 18,000 feet, more rigorous instrument flight rules (IFR) must be followed. Under IFR the pilot flies by reference to the aircraft instruments and follows special, IFR navigational charts. Most IFR flights must be coordinated by aircraft traffic control (ATC). Under most conditions, the pilot must be in two-way radio communication with ATC. As in the case of ground traffic, there can be heavy traffic in the air, particularly near airports.

While ground traffic can and often does come to full stop, aircraft, other than helicopters or balloons, cannot stop. Therefore, in lieu of coming to a complete stop in the air, ATC may instruct the pilot to fly a prescribed oval or race track shaped shape pattern called hold. The hold is generally defined in location and orientation by reference to a local navigational transmitter. The FAA also prescribes the entry method in which the pilot enters the hold. The entry method depends on a direction the airplane approaches the hold and the orientation of the hold. There are three standard entry methods. These are direct entry, parallel entry, and teardrop entry. Once established in the hold, the pilot will make all turns to the right, unless otherwise instructed by ATC or indicated by IFR navigational charts. When all the turns are made to the right, the holding pattern is called a right holding pattern or standard hold. When all turns are made to the left, the holding pattern is called a left holding pattern or non-standard hold. In order to determine the correct entry method into the hold, the pilot must calculate an angle between the orientation of the hold and the heading of the airplane. The pilot must then take into account whether the holding pattern is a right or left holding pattern. Unfortunately, the entry method for entering the hold can be difficult to compute and visualize especially under stress associated with operating an aircraft in an IFR environment. Often the pilot makes a mistake and uses the wrong entry method, sometimes with serious consequences.

There are, several devices available to help with the calculation of the entry method. Unfortunately, these devices are designed for use in the classroom and in training and are lacking in simplicity, speed, and complete information. Moreover, such devices are additional equipment to find in an already tight cockpit and are not easily attached to a pilot's knee-board. Moreover, such devices typically require two hands to operate and do not automatically provide an indication with north at the top, thus inducing the typical pilot to make a sketch of the holding pattern and entry method. Therefore, what is needed is an apparatus that will enable a pilot under the stress of instrument conditions to quickly determine and visualize a holding pattern orientation and the entry method for entering the holding pattern, that can be attached to a knee-board and can easily operated with one hand, while in flight.

SUMMARY OF THE INVENTION

One aspect of the present invention is an apparatus for determining and visualizing a holding pattern and a holding entry. The apparatus includes a base having top edge and adapted to be secured to a kneeboard and a disk having a first surface and a second surface distal the first surface. The disk may be imprinted on the disk first and second surfaces with degree indicia relative a center and including an indicia representing North. The apparatus further includes a first disk overlay, which is substantially transparent and imprinted with indicia including a right holding pattern, a holding fix, a holding radial, a teardrop initial heading, a teardrop entry path, a parallel entry path, a parallel final intercept course, a teardrop entry region, a parallel entry region, and a direct entry region. The disk overlay is rotatably affixed to the disk first surface at about the center of the disk. The disk overlay is adapted for easy rotation by one hand, about the holding fix indicia, wherein the disk overlay may be rotated to align the holding radial with a predetermined degree on the disk. The apparatus further includes a second disk overlay. Which is substantially transparent and imprinted with indicia including a left holding pattern, a holding fix, a holding radial, a teardrop initial heading, a teardrop entry path, a parallel entry path, a parallel final intercept course, a teardrop entry region, a parallel entry region, and a direct entry region. The second disk overlay rotatably affixed to the disk second surface at about the center of the disk, and distal the first disk overlay. The disk overlay is rotatable about the holding fix, wherein the disk overlay may be rotated to align the holding radial with a predetermined degree on the disk second surface. The apparatus further includes two connecting brackets. The connecting brackets are pivotally attached at one end to the base, and pivotally attached at another end to the disk. The axis of pivot of the disk about the connecting bracket is offset from the center of the disk. The disk may be easily pivoted by one hand, to dispose the disk first surface distal the base. The disk may also be easily pivoted by one hand to dispose the disk second surface distal the base. The degree indicia is disposed on the disk first surface with North proximate the top edge of the base when the disk first surface is distal the base and the degree indicia is disposed on the disk second surface with North proximate the top edge of the base when the disk second surface is distal the base.

One aspect of the present invention is an apparatus for determining and visualizing a holding pattern, the apparatus includes a base adapted to be secured to a surface, permitting operation of the apparatus by one hand. The apparatus further includes a disk having a first surface and a second surface distal the first surface, and a compass rose imprinted on the disk first and disk second surface. The apparatus further includes one or more disk overlays, which are substantially transparent and imprinted with indicia representing a holding pattern including a holding fix. The one or more disk overlays are rotatably affixed to the disk surface at about the center of the compass rose and are adapted for easy rotation by one hand, about the holding fix indicia. The apparatus further includes one or more connecting brackets pivotally attached at one end to the base, and pivotally attached at another end to the disk, the axis of pivot of the disk about the connecting bracket being offset from the center of the disk, permitting the disk to be easily pivoted by one hand.

One aspect of the present invention is an apparatus for determining and visualizing a holding pattern, the apparatus includes a base adapted to be secured to a surface, permitting operation of the apparatus by one hand. The apparatus further includes a disk having a first surface and a second surface distal the first surface, a compass rose imprinted on the disk first surface and a compass rose imprinted on the disk second surface. The apparatus further includes one or more disk overlays, which are substantially transparent and imprinted with indicia representing a holding pattern including a holding fix. The one or more disk overlays are rotatably affixed to the disk surface at about the center of the compass rose and are adapted for easy rotation by one hand. The apparatus further includes one or more connecting brackets pivotally attached at one end to the base, and pivotally attached at another end to the disk, permitting the disk to be easily pivoted by one hand.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the present invention may admit to other equally effective embodiments.

FIG. 3a is a plan view, diagram of an aircraft making a parallel entry to a right holding pattern in accordance with aspects of FAA procedures.

FIG. 3b is a plan view, diagram of an aircraft making a parallel entry to a nonstandard holding pattern in accordance with aspects of FAA procedures.

FIG. 4a is a plan view, diagram of an aircraft making a teardrop entry to a standard holding pattern in accordance with aspects of FM procedures.

FIG. 4b is a plan view, diagram of an aircraft making a teardrop entry to a left holding pattern in accordance with aspects of FAA procedures.

DETAILED DESCRIPTION OF THE PREFERRED EMBODIMENT

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

In order to more clearly understand the use of the invention, FIGS. 1-4 are presented to illustrate the problem a pilot has in visualizing a holding pattern and in determining an entry procedure for the holding pattern while flying in instrument conditions. FIGS. 5-14 are presented to illustrate the invention and the use of the invention as an aid to a pilot in the cockpit while flying in instrument conditions to visualize the assigned holding pattern and to determine the correct entry procedure.

Figure 1A:
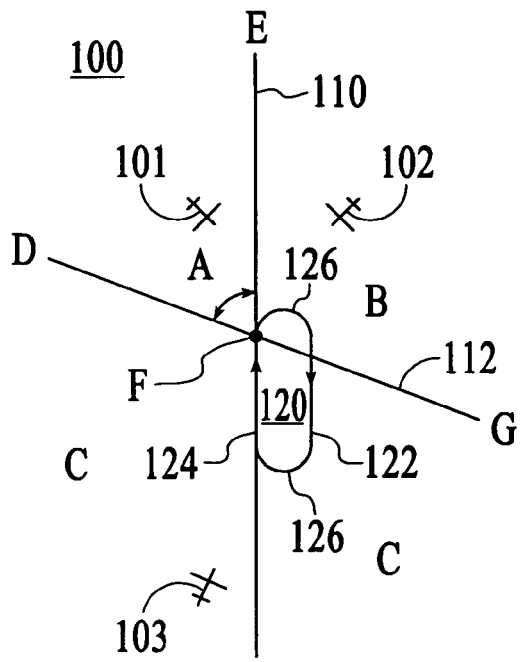
FIG. 1a is a plan view, diagram of a standard (right) holding pattern in accordance with aspects of FAA procedures.

FIG. 1a is a plan view, diagram of a standard (right) holding pattern 100 in accordance with aspects of FAA procedures. A holding fix F on a radial 110 is assigned by Air Traffic Control (ATC). Holding fix F may be defined by the intersection of radial 110 with another radial or by a predetermined distance from the source of radial 110. Right holding path 120 includes the holding fix F, an inbound course 124, and an outbound course 122. Inbound course 124 is coincident with radial 110 and flown in the direction of holding fix F. Outbound course 122 is parallel with radial 110 but flown away from fix F, in a direction opposite inbound course 124. Inbound course 124 and outbound course 122 are connected by a standard rate turn 126. It will be appreciated by practitioners of the art of instrument flying that in a standard holding pattern 120, all turns are made to the right while following the course of the holding path 120.

In practice, an aircraft once established in right holding path 120 begins a standard rate right turn upon intercepting holding fix F. A standard rate turn is a turn that takes one minute to complete 180 degrees or a turn of rate 3 degrees per minute. After completing a 180-degree standard rate right turn 126, the aircraft flies outbound from the fix F along outbound course 122 for about one minute. After about one minute flying along outbound course 122, the aircraft again makes a standard rate right turn 126 to the right for about one minute. After completing turn 126, the aircraft flies inbound along radial 110 towards holding fix F. In the absence of wind, the aircraft will arrive at holding fix after one minute and begin another standard rate turn to make another trip around the holding path 120. This will continue until the aircraft receives instructions from ATC to leave the hold. The standard rate turns 126 and outbound course 122 may be adjusted to accommodate wind effects and to ideally place the aircraft at the holding fix at the end of one minute on the inbound course 124.

Aircraft approaching holding fix F are required by FAA rules enter right holding path 120 according to prescribed procedures. For this purpose, airspace around holding fix F may be divided into three sectors, sectors A, B, and C by an imaginary line 112. Imaginary line 112 forms an acute angle DFE of about 70 degrees with radial 110. Angle DFE bounds sector A. An aircraft 101 approaching holding fix F from the area of sector A is required by FAA procedures to make a teardrop entry (described below) when entering holding path 120. Imaginary line 112 also forms an oblique angle EFG of about 110 degrees with radial E. Sector B is bounded by angle EFG. An aircraft 102 approaching holding fix F from the area of sector B is required by FAA procedures to make a parallel entry (described below) when entering holding path 120. Imaginary line 112 forms an angle DFG of about 180 degrees. Angle DFG bounds sector C. Sector C is the area distal imaginary line 112 from sectors A and B. An aircraft 103 approaching holding fix F from the area of sector C is required by FAA procedures to make a direct entry (described below) when entering holding path 120.

Figure 1B:
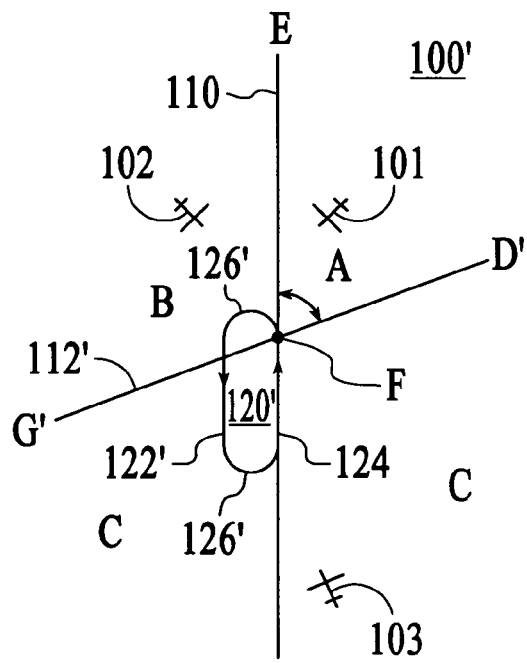
FIG. 1b is a plan view, diagram of a nonstandard (left) holding pattern in accordance with aspects of FAA procedures.

FIG. 1b is a plan view, diagram of a nonstandard (left) holding pattern 100' in accordance with aspects of FAA procedures. In the nonstandard holding pattern 100' all turns are made to the left. Consequently, left holding pattern 100' is a mirror image of right holding pattern 100. Nonstandard holding patterns 110' are established to avoid areas of heavy air traffic, obstructions, and terrain. A left holding path 120' includes outbound course 122' and inbound course 124. It will be appreciated by practitioners of the art of instrument flying that inbound course 124 and outbound course 122' are connected by standard rate turns 126' that are made to the left. In the nonstandard holding pattern, imaginary line 112' forms acute angle D'FE of about 70 degrees with radial 110. Sector A is bounded by angle D'EF. Imaginary line 112' forms oblique angle EFG' of about 110 degrees with radial 110. Sector B is bounded by angle EFG'. Imaginary line 112'. Imaginary line 112 'forms an angle D'FG' of about 180 degrees. Angle D'FG' bounds sector C. Sector C is the area distal imaginary line 112' from sectors A and B.

Figure 2A:
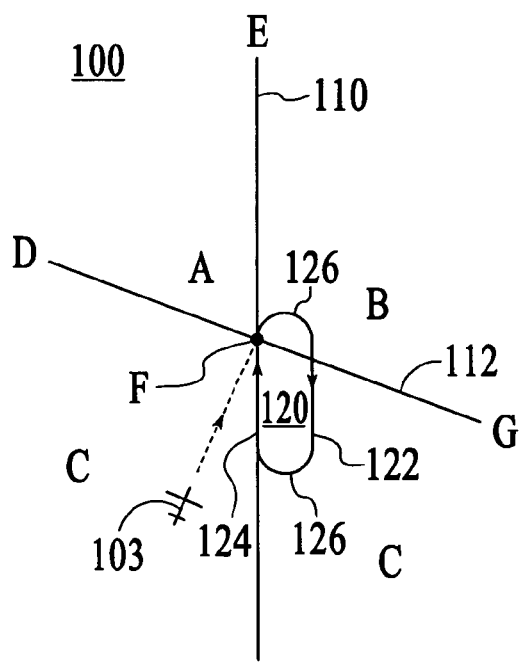
FIG. 2a is a plan view, diagram of an aircraft making a direct entry to a standard holding pattern in accordance with aspects of FAA procedures.

FIG. 2a is a plan view, diagram of an aircraft 103 making a direct entry to a standard holding pattern 100 in accordance with aspects of FAA procedures. When the aircraft 103 arrives at the holding fix F after approaching from anywhere in sector C, the aircraft 103 begins a standard rate turn 126 to the right. The aircraft 103 continues the standard rate turn to the right until established on the outbound course 122. From that point, the aircraft may continue to follow the right holding path 120 as described above.

Figure 2B:
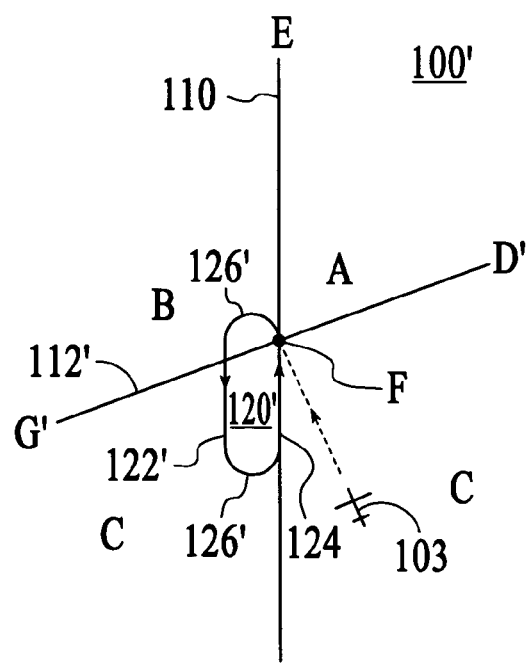
FIG. 2b is a plan view, diagram of an aircraft making a direct entry to a left holding pattern in accordance with aspects of FAA procedures.

FIG. 2b is a plan view, diagram of an aircraft 103 making a direct entry to a left holding pattern 100' in accordance with aspects of FAA procedures. When the aircraft 103 arrives at the holding fix F after approaching from anywhere in sector C, the aircraft 103 begins a standard rate turn 126' to the left. The aircraft 103 continues the standard rate turn to the left until established on the outbound course 122'. From that point, the aircraft may continue to follow the left holding path 120' as described above.

FIG. 3a is a plan view, diagram of an aircraft 102 making a parallel entry to a right holding pattern 100 in accordance with aspects of FAA procedures. When the aircraft 102 arrives at the holding fix F after approaching from anywhere in sector B, the aircraft 102 turns to fly a parallel path 324. Parallel path 324 is parallel to inbound course 124 in a direction opposite to inbound course 124. The aircraft 102 flies the parallel path 324 for about 1 minute then begins a standard rate turn 326 to the left until established on the inbound course 124. From that point, the aircraft may continue to follow the right holding path 120 as described above.

FIG. 3b is a plan view, diagram of an aircraft 102 making a parallel entry to a nonstandard holding pattern 100' in accordance with aspects of FAA procedures. When the aircraft 102 arrives at the holding fix F after approaching from anywhere in sector B, the aircraft 102 turns to fly the parallel path 324. The aircraft 102 flies the parallel path 324 for about 1 minute then begins a standard rate turn 326' to the right until established on the inbound course 124. From that point, the aircraft may continue to follow the left holding path 120' as described above.

FIG. 4a is a plan view, diagram of an aircraft 101 making a teardrop entry to a standard holding pattern 100 in accordance with aspects of FAA procedures. When the aircraft 101 arrives at the holding fix F after approaching from anywhere in sector A, the aircraft 101 turns to fly outbound from holding fix F on a teardrop path 424. Teardrop path 424 is prescribed by the FAA to be at an angle H of about 30 degrees to the left of inbound course 124. The aircraft 101 flies the teardrop path 424 for about 1 minute then begins a standard rate turn 426 to the right until established on the inbound course 124. From that point, the aircraft may continue to follow the right holding path 120 as described above.

FIG. 4b is a plan view, diagram of an aircraft 101 making a teardrop entry to a left holding pattern 100' in accordance with aspects of FAA procedures. When the aircraft 101 arrives at the holding fix F after approaching from anywhere in sector A, the aircraft 101 turns to fly outbound from holding fix F on a teardrop path 424'. Teardrop path 424' is prescribed by the FAA to be at an angle H of about 30 degrees to the right of inbound course 124. The aircraft 101 flies the teardrop path 424' for about 1 minute then begins a standard rate turn 426' to the left until established on the inbound course 124. From that point, the aircraft may continue to follow the left holding path 120' as described above.

Figure 5:
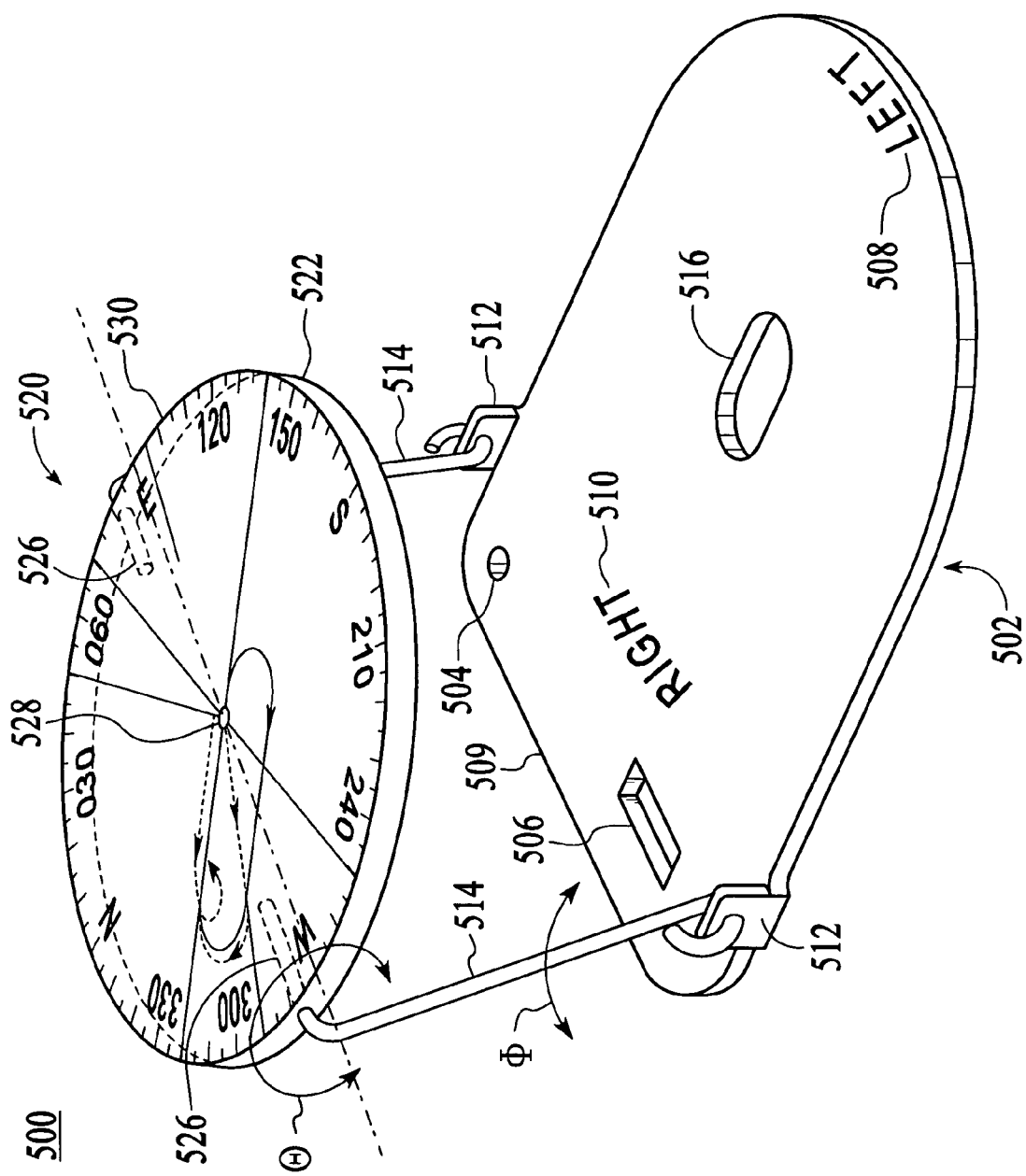
FIG. 5 is a front perspective view of one embodiment of a holding pattern aid in accordance with aspects of the invention.
Figure 6:
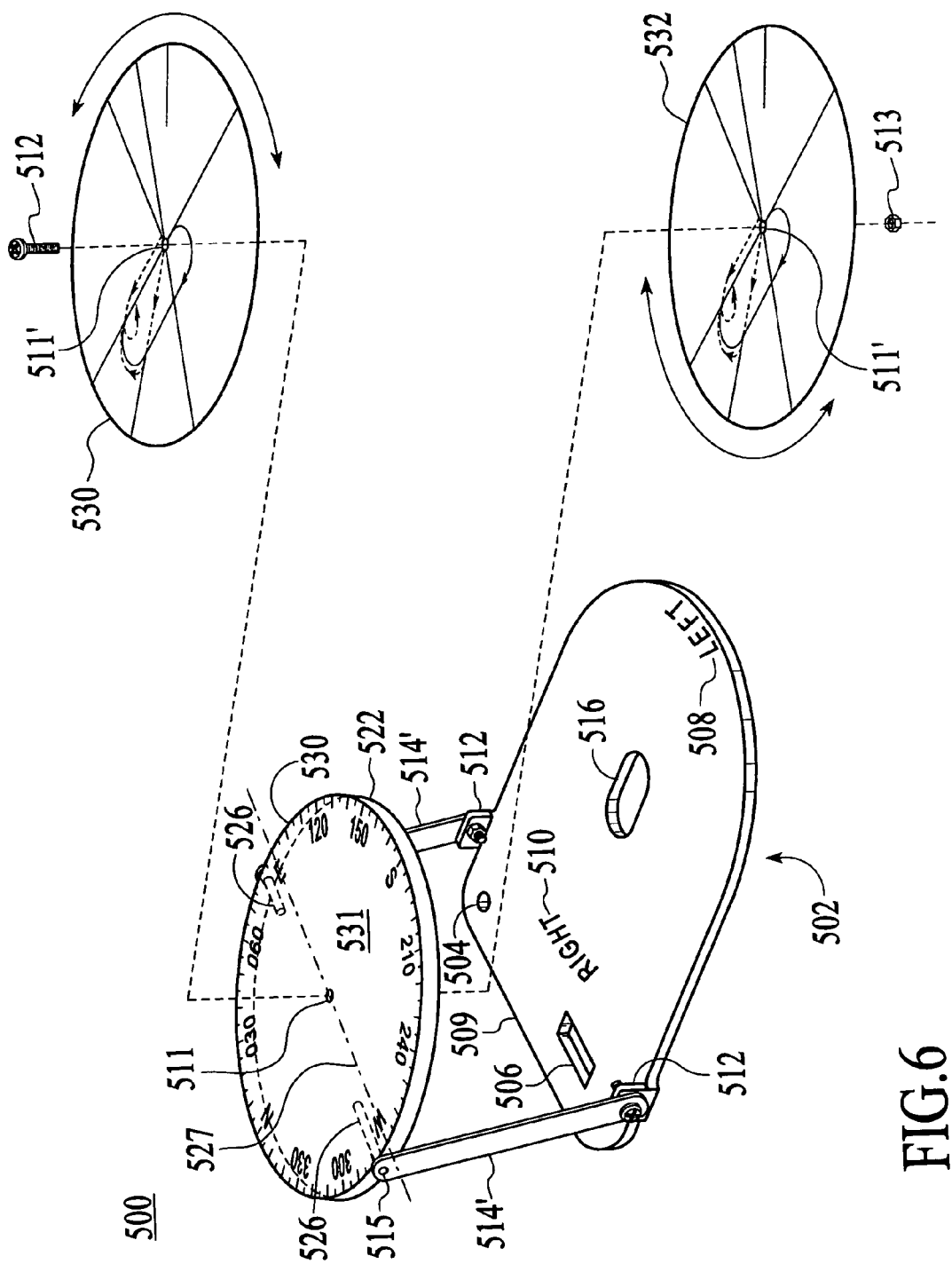
FIG. 6 is an exploded front perspective view of the holding pattern aid in accordance with aspects of the invention.

FIG. 5 is a front perspective view of one embodiment of a holding pattern aid 500 in accordance with aspects of the invention. FIG. 6 is an exploded front perspective view of the holding pattern aid 500 in accordance with aspects of the invention. Holding pattern aid 500 includes a base 502 connected to a holding pattern display 520 by one or more connecting brackets 514. Base 502 includes one or more tabs 512 adapted to pivotally engage brackets 514 and adapted to pivot through a predetermined angle φ. Bracket 514 is illustrated as bent in a loop to secure bracket 514 to tab 512. Alternatively, bracket 514 may be secured to tab 512 by rivet, screw, grommet, or other like fastener adapted to permit pivoting of bracket 514 through predetermined angle φ. Base 520 further includes aperture 504 adapted to accept a lanyard (illustrated below) for securing holding pattern aid 500 to advantage. Base 502 further includes a left indicia 508 and a right indicia 510 for alerting the user that holding pattern aid 500 is configured to illustrate a standard (right) holding pattern or a nonstandard (left) holding pattern. Right indicia 510 may include the word "RIGHT" for example. Left indicia 508 may include the word "LEFT" for example. Other characters may be used to advantage, for example "R" and "L". Base 502 further includes kneeboard aperture 506 for engaging a pilot kneeboard clamp (illustrated below).

Holding pattern display 520 includes a disk 522, a right overlay 530, a left overlay 532, and an overlay axis 528. A face 531 of disk 522 may be imprinted with degree indicia representing a compass rose. A face 533 (illustrated below in FIG. 10), distal face 531 of disk 522 may be imprinted with degree indicia representing a compass rose. FIG. 5, for example illustrates face 531 imprinted with a compass rose including degree indicia every 5 degrees and numeric degree indicia every 20 degrees as well as indicia representing North "N", South "S", East "E", and West "W". "N", is oriented such that the "N" is proximate an upper edge 509 when face 531 is the visible face. Face 533 may be imprinted with the same compass rose in the same orientation as face 531, i.e. with "N" proximate the upper edge 509 when face 533 is the visible face.

Right overlay 530 may be imprinted with a representation of a right holding pattern (described below). Left overlay 532 may be imprinted with a representation of a left holding pattern (described below). Left overlay 532 may be a mirror image of right overlay 530. Overlay axis 528 is illustrated in FIG. 6 as including a screw 512, a nut 513 and an aperture 511 and 511'. Screw 512 and nut 513 may rotationally secure overlays 530 and 532 to disk 522 by engaging apertures 511 and 511' while permitting overlay 530 free rotation about overlay axis 528. Alternatively, overlays 530 and 532 may be rotationally affixed to disk 522 by rivets, grommets, or other fasteners adapted to permit free rotation of overlays 530 and 532 about overlay axis 528. Aperture 516 permits holding pattern display 520 to lay flat on base 502 without interference with nut 513 or screw 512.

Disk 522 may include one or more cavities 526 for pivotally accepting brackets 514. FIG. 5 illustrates brackets 514 bent at right angles for engaging a cavity 526 in disk 522 and permitting free pivoting of disk 522 through a predetermined angle Θ. However, bracket 514' may also be a substantially flat material, as illustrated in FIG. 6. The bracket 514' may be secured by fastening means, such as screws, pins, nails, dowels, detents, or rivets for example, adapted for pivotally engaging bracket 514 and permitting free pivoting of disk 522 through a predetermined angle Θ. Alternatively, a fastening means such as a post may be affixed to disk 522 for pivotally engaging bracket 514 and permitting free pivoting of disk 522 through a predetermined angle Θ.

A centerline 527 is illustrated bisecting disk 522 along a line from W to E, through overlay axis 528, on disk 522. The centerline 527 is for illustrative purposes and is not part of the invention or markings printed on face of the disk 522 or the overlays 530, 532. An offset between the centerline 527 and pivot cavity 526 may be sized to permit disk 522 to cover left indicia 508 when bracket 514 is parallel with base 502, while permitting right indicia 510 to remain visible to the user when overlay 530 is visible. The offset between centerline 527 and pivot cavity 526 also may be sized to permit disk 522 to cover right indicia 508 while permitting left indicia 510 to remain visible to the user when overlay 532 is visible.

Figure 7:
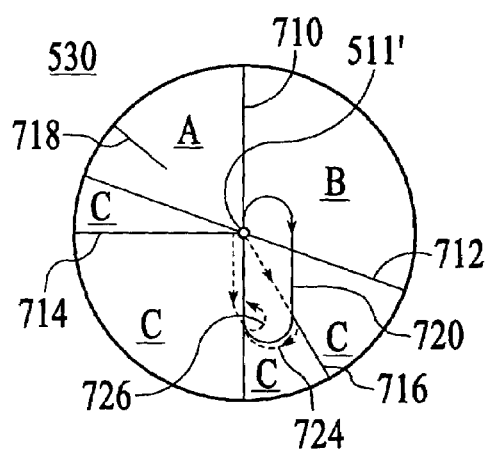
FIG. 7 is a layout of the printed markings on a right overlay of FIG. 6 in accordance with aspects of the invention.
Figure 9:
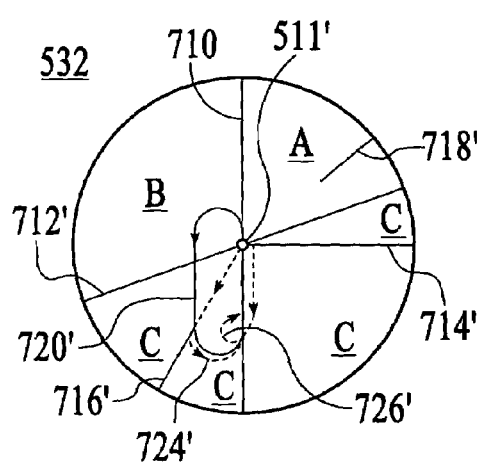
FIG. 9 is a layout of the printed markings on a left overlay of FIG. 6 in accordance with aspects of the invention.

FIG. 7 is a layout of the printed markings on the right overlay 530 in accordance with aspects of the invention. FIG. 9 is a layout of the printed markings on the left overlay 532 in accordance with aspects of the invention. FIG. 7 shows printed markings that are a mirror image the printed markings of FIG. 9. Overlays 530,532 may be substantially transparent to permit the indicia on disk faces 531,533 to be visible to the user. Right overlay 530 is a diagrammatic representation of a right holding pattern 100. Right overlay 530 includes a radial 710 representing radial 110, an imaginary line 712 representing imaginary line 112, a right holding path 720 representing right holding path 120, and a holding fix at aperture 511' representing holding fix F. Right overlay 530 further includes a teardrop entry path 724 representing teardrop path 424, and a parallel entry path 726 representing parallel path 324. Right overlay 530 further includes a teardrop entry course indicator 716, which indicates a course to turn to upon crossing the holding fix F for executing a teardrop entry procedure. Right overlay 530 further includes a parallel intercept indicator 718, which indicates a final course to turn to for completing the teardrop entry procedure and intercepting the inbound course 124. Right overlay 530 further includes a DME Arc indicator 714 which may be useful for flying a DME Arc procedure. The DME Arc indicator 714 may also be useful for indicating when the pilot is abeam the holding fix and may begin timing the outbound leg of the hold. Sector A, sector B, and sector C may be color tinted transparencies according to a color scheme selected to advantage for ease of recognition during flight. Right holding path 720, radial 710, imaginary line 712, teardrop entry path 724, parallel entry path 726, teardrop entry course indicator, 716 parallel intercept indicator 718 and DME Arc indicator 714 may be color coded according to a color scheme to advantage, to enhance quick and easy recognition.

Left overlay 532 is a diagrammatic representation of a left holding pattern 100. Left overlay 532 includes a radial 710 representing radial 110, an imaginary line 712' representing imaginary line 112', a left holding path 720' representing left holding path 120', and a holding fix at aperture 511' representing holding fix F. Left overlay 532 further includes a teardrop entry path 724' representing teardrop path 424', and a parallel entry path 726 representing parallel path 324. Left overlay 532 further includes a teardrop entry course indicator 716', which indicates a course to turn to upon crossing the holding fix F for executing a teardrop entry procedure. Left overlay 532 further includes a parallel intercept indicator 718', which indicates a final course to turn to for completing the teardrop entry procedure and intercepting the inbound course 124. Left overlay 532 further includes a DME Arc indicator 714' which may be useful for flying a DME Arc procedure. Sector A, sector B, and sector C may be color tinted transparencies according to a color scheme selected to advantage for ease of recognition during flight. Left holding path 720', radial 710, imaginary line 712', teardrop entry path 724', parallel entry path 726', teardrop entry course indicator, 716' parallel intercept indicator 718', and DME Arc indicator 714' may be color coded according to a color scheme to advantage, to enhance quick and easy recognition.

Figure 8:
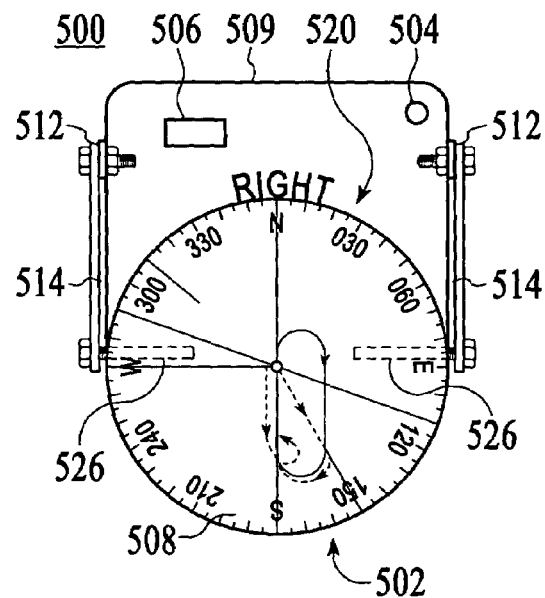
FIG. 8 is a top plan view of the holding pattern aid in accordance with aspects of the invention.

FIG. 8 is a top plan view of the holding pattern aid 500 in accordance with aspects of the invention. Holding pattern display 520 is illustrated disposed with the right overlay 530 and face 531 visible to the user. Right indicia 510 "RIGHT" is also visible to the user. FIG. 8 also illustrates flat brackets 514'.

Figure 10:
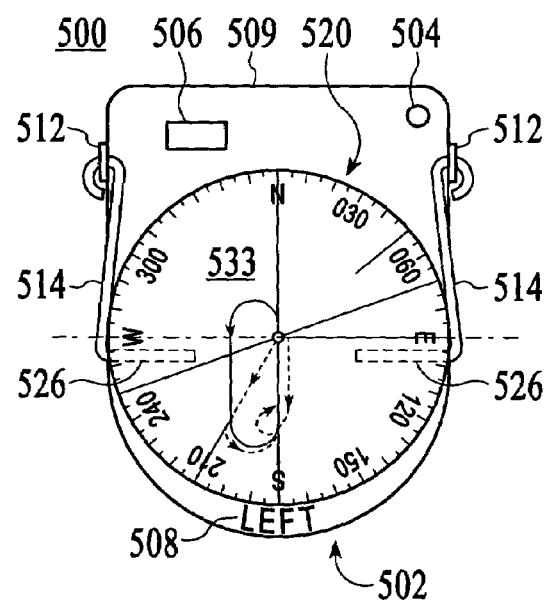
FIG. 10 is a top plan view of the holding pattern aid in accordance with aspects of the invention.

FIG. 10 is a top plan view of the holding pattern aid 500 in accordance with aspects of the invention. Holding pattern display 520 is illustrated disposed with the left overlay 532 and face 533 visible to the user. Left indicia 508 "LEFT" is also visible to the user.

Figure 11:
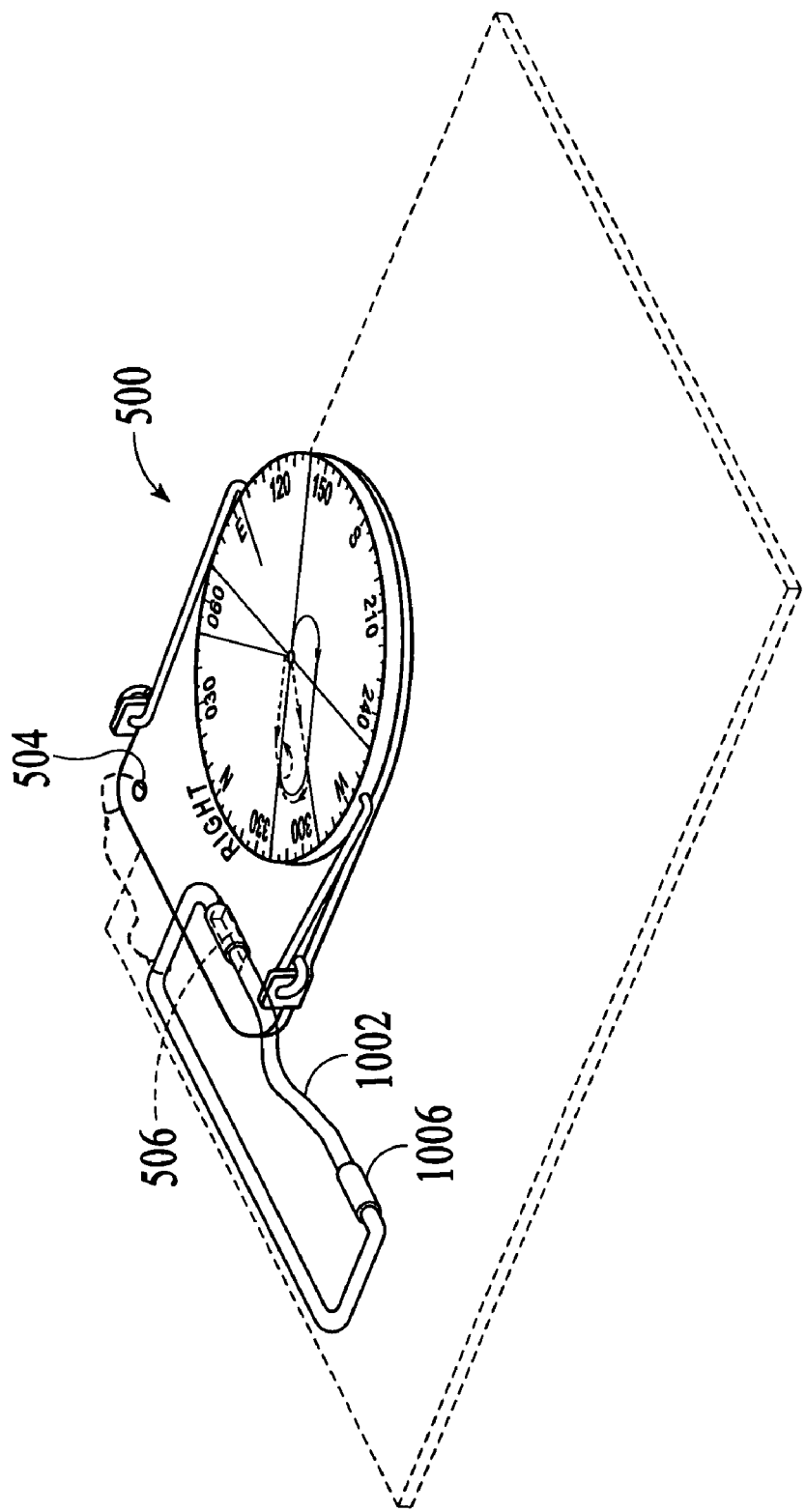
FIG. 11 is a front perspective view of the holding pattern aid disposed on a kneeboard.

FIG. 11 is a front perspective view of the holding pattern aid 500 disposed on a kneeboard. The kneeboard is not a part of the invention. The typical kneeboard includes a spring-biased clip 1002 for securing notepaper. The clip 1002 typically has two or more cylindrical pads 1006 mounted proximate corners for increasing friction between the clip 1002 and notepaper. Aperture 506 may be sized to advantage for engaging cylindrical pad 1006 to constrain holding pattern aid 500 in position and prevent slippage.

In operation, holding pattern aid 500 may be secured to any fixed surface, such as a kneeboard for example. The aperture may engage the clip 1002 and/or the cylindrical pads 1006, rigidly fixing holding pattern aid 500 relative the kneeboard. A lanyard may be secured to aperture 504 to enable the pilot to quickly locate a loose holding pattern aid 500 or to prevent the aid 500 from becoming lost should it accidentally be released from the kneeboard clip. The holding pattern display 520 may be lifted up by pivoting the brackets 514 about tabs 512, and flipped over. Thus right overlay 530 or left overlay 532 may be placed face up for view by the pilot. The offset between the bracket 514 engagement points 526 and the centerline results in either the right indicia 510 or the left indicia 508 informing the pilot of the orientation of the holding pattern display 520. Should the pilot wish to change from a left overlay 532 to a right overlay 530, for example, the pilot simply lifts up the holding pattern display 520 and flips it over and sets it back flat on base 502. This motion may be quickly accomplished with one hand or even the flick of one finger since the base is secured to the kneeboard. The pilot may then rotate the desired overlay, such as the right overlay 532 for example, to place the radial 710 coincident with the radial assigned by ATC. Such rotation may be accomplished by one hand since the holding pattern aid 500 is rigidly fixed. The right holding pattern 720 is displayed relative the compass rose on face 531. The pilot may then quickly determine at a glance the appropriate entry procedure based on the aircraft bearing to the fix F and the display 520. If the pilot executes a teardrop entry, the teardrop entry course indicator 716 tells the pilot instantly what bearing to turn to upon crossing the holding fix F. If the pilot executes a parallel entry, the parallel intercept indicator 718 tells the pilot instantly what the final bearing will be for intercepting the inbound course upon completing the parallel intercept procedure. The DME Arc indicator 714 may be used for indicating when the pilot may begin timing the outbound leg of the hold abeam the holding fix F. The DME Arc indicator 714 may also be useful by pilots skilled in the arts of flying instruments for flying a DME Arc procedure. The radial 710 may be used for instantly determining bearing reciprocals. In this example a right overlay 530 was used. Similarly the left overlay 532 may also be disposed with the flick of a finger, and then rotated into a predetermined position. The display 520 may then be used to visualize the left hold and determine the appropriate entry procedure.

While the foregoing is directed to embodiments of the present invention, other and further embodiments of the invention may be devised without departing from the basic scope thereof, and the scope thereof is determined by the claims that follow.

The invention claimed is:

1. An apparatus for determining and visualizing a holding pattern and a holding entry, the apparatus comprising:
   a base having a top edge and configured to be secured to a kneeboard;
   a disk having a first surface, a second surface distal the first surface, and degree indicia imprinted on the first and second surfaces of the disk, the degree indicia including a symbol representing North;
   a first disk overlay substantially transparent and imprinted with indicia representing a holding fix, a holding radial, a right holding pattern, and for the right holding pattern a teardrop initial heading, a teardrop entry path, a parallel entry path, a parallel final intercept course, a teardrop entry region, a parallel entry region, and a direct entry region,
      the first disk overlay rotatably affixed to the disk first surface at about a center of the disk,
      the first disk overlay configured for easy rotation by one hand for alignment of the holding radial with a predetermined degree on the disk first surface;
   a second disk overlay, substantially transparent and imprinted with indicia representing a holding fix, a holding radial, a left holding pattern, and for the left holding pattern a teardrop initial heading, a teardrop entry path, a parallel entry path, a parallel final intercept course, a teardrop entry region, a parallel entry region, and a direct entry region,
      the second disk overlay rotatably affixed to the disk second surface at about the center of the disk,
      the second disk overlay configured for easy rotation by one hand for alignment of the holding radial with a predetermined degree on the disk second surface; and
   two connecting brackets pivotally attached at one end to the base and pivotally attached at another end to the disk, the axis of pivot of the disk about the connecting brackets being offset from the center of the disk,
   wherein the disk may be easily pivoted by one hand to dispose the disk first surface distal the base or to dispose the disk second surface distal the base, and wherein the symbol representing North is proximate the top edge of the base when the disk first surface is distal the base and the symbol representing North is proximate the top edge of the base when the disk second surface is distal the base.

2. The apparatus of claim 1, wherein the base includes a right indicia, the right indicia configured to be visible when the disk is pivoted to dispose the disk first surface distal the base and covered by the disk when the disk is pivoted to dispose the disk second surface distal the base.

3. The apparatus of claim 1, wherein the base includes a left indicia, the left indicia configured to be visible when the disk is pivoted to dispose the disk second surface distal the base and covered by the disk when the disk is pivoted to dispose the disk first surface distal the base.

4. The apparatus of claim 1, wherein: the parallel entry region of the first and second disk overlay is tinted with a unique color whereby the parallel entry region is quickly and easily recognized.

5. The apparatus of claim 1, wherein: the direct entry region of the first and second disk overlay is tinted with a unique color whereby the direct entry region is quickly and easily recognized.

6. The apparatus of claim 1, wherein: the teardrop entry region of the first and second disk overlay is tinted with a unique color whereby the teardrop entry region is quickly and easily recognized.

7. The apparatus of claim 1, wherein: indicia representing the right holding pattern, the holding fix, the holding radial, the teardrop initial heading, the teardrop entry path, the parallel entry path, and the parallel final intercept course are color coded for quickly and easy recognition.

8. The apparatus of claim 1, wherein: the indicia representing the left holding pattern, the holding fix, the holding radial, the teardrop initial heading, the teardrop entry path, the parallel entry path, and the parallel final intercept course are color coded for quickly and easy recognition.

9. The apparatus of claim 1, wherein: the connecting brackets are pivotally attached to the base by fastening means.

10. The apparatus of claim 1, wherein: the connecting brackets are pivotally attached to the disk by fastening means.

11. The apparatus of claim 1, wherein: the base includes an aperture adapted to accept a lanyard for securing the apparatus.

12. The apparatus of claim 1, wherein: the connecting brackets are pivotally attached to the base and the disk by fastening means.

13. The apparatus of claim 1, further comprising a lanyard attached to the base.

14. An apparatus for determining and visualizing a holding pattern, the apparatus comprising:
- a base configured to be secured to a surface, permitting operation of the apparatus by one hand;
- a disk having a first surface and a second surface distal the first surface;
- a first compass rose imprinted on the disk first surface and a second compass rose imprinted on the disk second surface;
- one or more substantially transparent disk overlays imprinted with indicia representing a holding pattern including a holding fix,
    - the one or more disk overlays rotatably affixed to the disk surface at about the center of the compass rose,
    - the one or more disk overlays configured for easy rotation by one hand, about the holding fix indicia; and
- a connecting bracket attached at one end to the base, and pivotally attached at another end to the disk, the axis of pivot of the disk about the connecting bracket being in the plane of the disk and offset from the center of the disk,
- wherein the disk may be easily pivoted by one hand to alternately dispose the first or second surface in position for viewing.

15. The apparatus of claim 14, wherein: the connecting brackets are pivotally attached to the base and the disk by fastening means.

16. The apparatus of claim 14, further including an aperture adapted to accept a lanyard for securing the apparatus.

17. An apparatus for determining and visualizing a holding pattern, the apparatus comprising:
- a base configured to be secured to a surface, permitting operation of the apparatus by one hand;
- a disk having a first surface and a second surface distal the first surface;
- a first compass rose imprinted on the disk first surface and a second compass rose imprinted on the disk second surface;
- one or more substantially transparent disk overlays imprinted with indicia representing a holding pattern including a holding fix,
    - the one or more disk overlays rotatably affixed to the disk surface at about the center of the compass rose,
    - the one or more disk overlays adapted for easy rotation by one hand; and
- a connecting bracket attached at one end to the base, and pivotally attached at another end to the disk, the axis of the pivotal attachment in the plane of the disk
- wherein the disk may be easily pivoted by one hand.

18. The apparatus of claim 17, further including indicia representing a holding radial, a teardrop initial heading, a teardrop entry path, a parallel entry path, a parallel final intercept course, a teardrop entry region, a parallel entry region, and a direct entry region.

19. The apparatus of claim 18, wherein the indicia representing the left holding pattern, the holding fix, the holding radial, the teardrop initial heading, the teardrop entry path, the parallel entry path, and the parallel final intercept course are color coded for quick and easy recognition.

20. The apparatus of claim 17, wherein: the connecting brackets are pivotally attached to the base and the disk by fastening means.

* * * * *